United States Patent
Vegh

(10) Patent No.: US 7,092,743 B2
(45) Date of Patent: Aug. 15, 2006

(54) METHOD AND APPARATUS TO REPLY TO CALL

(75) Inventor: Moshe Vegh, Netanya (IL)

(73) Assignee: Intel Corporation, Santa Clara, CA (US)

( * ) Notice: Subject to any disclaimer, the term of this patent is extended or adjusted under 35 U.S.C. 154(b) by 474 days.

(21) Appl. No.: 10/327,950

(22) Filed: Dec. 26, 2002

(65) Prior Publication Data

US 2004/0127263 A1     Jul. 1, 2004

(51) Int. Cl.
*H04B 1/38* (2006.01)

(52) U.S. Cl. .............. 455/567; 455/412.2; 455/415

(58) Field of Classification Search ............. 455/567, 455/67.7, 415, 566, 412.1, 412.2, 417
See application file for complete search history.

(56) References Cited

U.S. PATENT DOCUMENTS

| | | | | |
|---|---|---|---|---|
| 5,471,470 A | * | 11/1995 | Sharma et al. ............. 370/271 |
| 5,513,247 A | * | 4/1996 | Mukerjee et al. ............. 455/403 |
| 6,157,630 A | * | 12/2000 | Adler et al. .............. 370/338 |
| 6,301,338 B1 | * | 10/2001 | Makela et al. ............. 379/88.21 |
| 6,424,841 B1 | * | 7/2002 | Gustafsson .............. 455/466 |
| 6,466,782 B1 | * | 10/2002 | Ishikawa et al. ........... 455/412.2 |
| 6,757,534 B1 | * | 6/2004 | Bach et al. .............. 455/417 |
| 6,810,260 B1 | * | 10/2004 | Morales ................ 455/460 |
| 6,842,622 B1 | * | 1/2005 | Peters et al. ............. 455/458 |
| 6,895,237 B1 | * | 5/2005 | Scott .................. 455/414.1 |
| 2003/0134626 A1 | * | 7/2003 | Himmel et al. ............ 455/419 |

* cited by examiner

*Primary Examiner*—Quochien B. Vuong
*Assistant Examiner*—Christian A. Hannon
(74) *Attorney, Agent, or Firm*—Pearl Cohen Zedek Latzer, LLP

(57) ABSTRACT

Briefly, a method and a wireless communication system that may include at least one mobile station and at least one base station to reply to an incoming call addressed to the mobile station with a predefined message. The mobile station may be configured to reply to the incoming call based on the preferences of a user of the mobile station.

19 Claims, 3 Drawing Sheets

METHOD AND APPARATUS TO REPLY TO CALL

BACKGROUND OF THE INVENTION

Mobile communications devices, for example, handsets of a cellular communication system, may be used to send and receive calls between a caller and a recipient, e.g., a handset user. Types of calls may include voice calls, video calls, text calls, data calls and the like.

In certain situations, the recipient may not be able to receive incoming calls. Those situations may occur when, for example, the handset is not in operation, the handset is not under the coverage of a cellular communication system, the handset user is attending a social event or a meeting, the handset is operated in a restricted zone where operation of wireless communication devices is not authorized, e.g., some hospitals, or in other situations in which a user does not respond to calls.

Thus, the user may not respond to some of the calls and the caller may have no indication whether or not the intended recipient receives the call.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
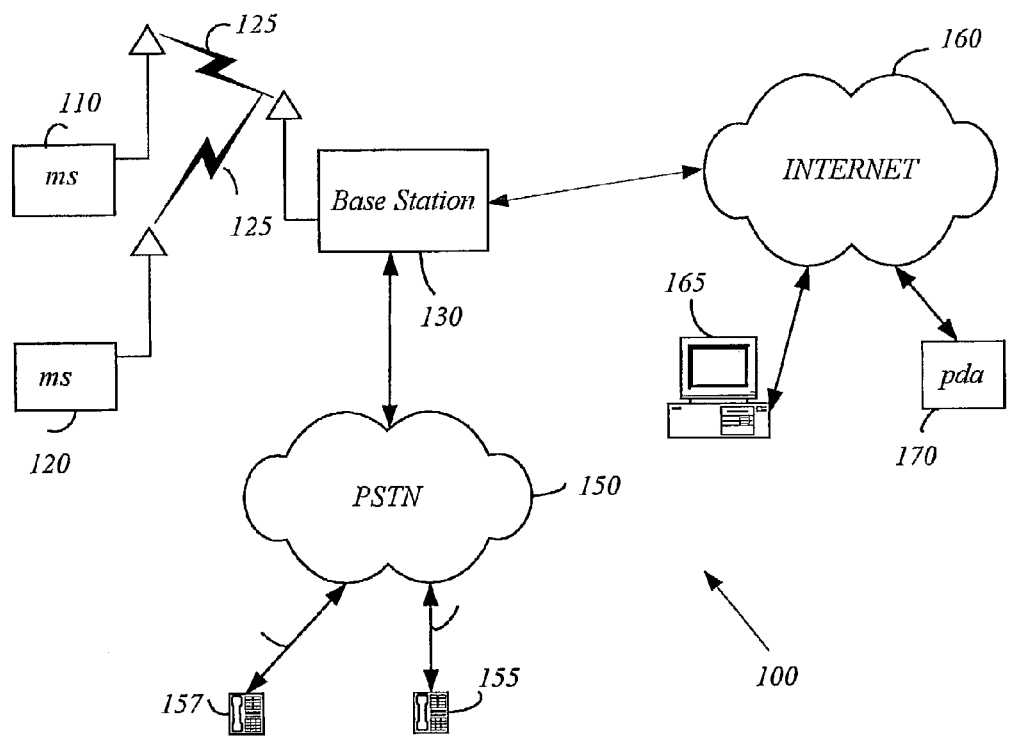
FIG. 1 is a schematic block diagram of a portion of wireless communication system according to an exemplary embodiment of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as mobile stations and base stations of a radio-telephone communication systems, for example a cellular communication system.

Types of cellular communication systems intended to be within the scope of the present invention may include, although are not limited to, Code Division Multiple Access (CDMA) and WCDMA cellular radiotelephone portable devices for transmitting and receiving spread spectrum signals, Global System for Mobile communication (GSM) cellular radiotelephone, Time Division Multiple Access (TDMA), Extended-TDMA (E-TDMA), General Packet Radio Service (GPRS), Extended GPRS, and the like.

Turning to FIG. 1, a schematic block diagram of a portion of cellular communication system 100 according to an exemplary embodiment of the invention is shown. Although the scope of the present invention is not limited in this respect, the cellular communication system may include mobile stations (MS) 110 and 120 and a base station (BS) 130. In some embodiments of the invention, BS 130 may be operably coupled to a public switched telephone network (PSTN) 150 to enable MS 110 and 120 to receive calls and/or to place calls to a telephone 155 and/or a facsimile machine 157. Furthermore, in some embodiments of the present invention, BS 130 may be operably coupled to the Internet 160, allowing MS 110 and 120 to access services and other entities over the Internet, if desired. For example, using an Internet connection, MS 110 and 120 may establish access to electronic mail services, surfing services, voice over Internet protocol (IP) telephone calls and the like. Those services may be provided to a user of a personal computer (PC) 165 and/or to a user of a personal digital assistance 170, if desired.

Although the scope of the present invention is not limited in this respect, MS 110 may receive a call form MS 120, for example, a voice call, or a data call such as, for example, a text message, an image, a video clip and the like. BS1 130 may deliver the call from MS 120 to MS 110 via an air link 125, if desired.

Figure 2:
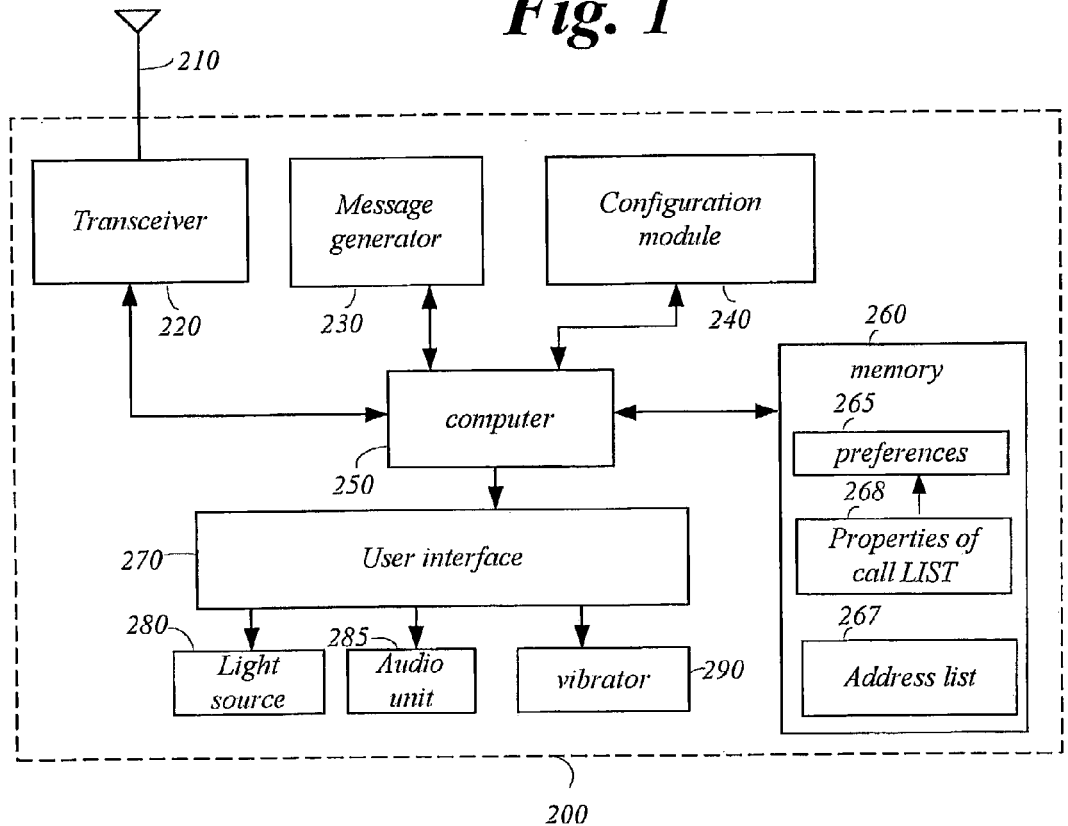
FIG. 2 is a schematic block diagram of a mobile station according to an exemplary embodiment of the present invention.

Turning to FIG. 2, a block diagram of a mobile station (MS) 200 according to an exemplary embodiment of the present invention is shown. Although the scope of the present invention is not limited in this respect, MS 200 may include an antenna 210, a transceiver 220, a message generator 230, a configuration module 240, a computer 250, a memory 260, and a user interface 270. In addition, a light source 280, an audio unit 285, and a vibrator 290 may be operably coupled to user interface 270.

In operation, a user of MS 200 may configure MS 200 to receive and reply to incoming calls according to user-selectable preferences. Accordingly, configuration module 240 may store a configuration of user-selectable preferences in a preference list 265 that may be located in memory 260. Although the scope of the present invention is not limited in this respect, types of memory that may be used with embodiments of the present invention may include, for example, a shift register, a flip flop, a Flash memory, a random access memory (RAM), dynamic RAM (DRAM), static RAM (SRAM) and the like.

Although the scope of the present invention is not limited in this respect, the user may configure MS 200 to reply to an incoming call with a message, which may be generated by message generator 230. Accordingly, in some embodiments of the invention, message generator 230 may generate text messages, audio messages, video messages, data messages, and the like. Furthermore, configuration module 240 may be designed to configure message generator 230 to generate a message with a predefined message type and a predefined message content, in accordance with the user preferences, which may include rules defining reply criteria, i.e., how and when to reply to different types of incoming calls.

Although the scope of the present invention is not limited in this respect, MS 200 may receive a call, for example, a voice call, a data call, or the like, over an air link, for example, air link 125. Antenna 210, for example, a dipole antenna, may receive modulated signals that may carry the call. Transceiver 220 may demodulate the modulated signals and may provide data that may include a call property to computer 250. For example, the call property may include a telephone number of a caller, a call type, e.g. voice, data and the like. Furthermore, a call property list 268 may be stored in memory and computer 250 may search call property list for the received property and may search preference list 265 for a rule to generate a reply message based on the call property.

Accordingly, in one mode of operation, which may be useful when the user is able to respond to the call, computer 250 may command user interface 270 to notify the user that the call has been received. For example, user interface 270 may notify the user of MS 200 of an incoming call by providing an audible sound, e.g., a tune and/or a ring, which may be generated by audio unit 285. Additionally or alternatively, user interface 270 may notify the user of MS 200 of the incoming call by operating vibrator 295 and/or by blinking light source 280.

Although the scope of the present invention is not limited in this respect, in other modes of operation which may be useful when the user is unable to respond to the call, computer 250 may identify the caller and may command message generator 230 to generate a reply message to the caller. Transceiver 220 may then demodulate the message and transmit the message to the caller.

Although the scope of the present invention is not limited in this respect, computer 250 may identify the caller by searching an address list 267 and matching the caller information received by the call with entries stored in address list, if desired. Furthermore, message generator 230 may generate a reminder message that may be sent and stored at BS 130. BS 130 may send the reminder message to MS 200 in accordance with the preferences selected by the user of MS 200. In addition, user interface 270 may notify the user of the incoming call by operating at least one light source, e.g., light source 280, and/or audio unit 285 and/or vibrator 290.

Figure 3:
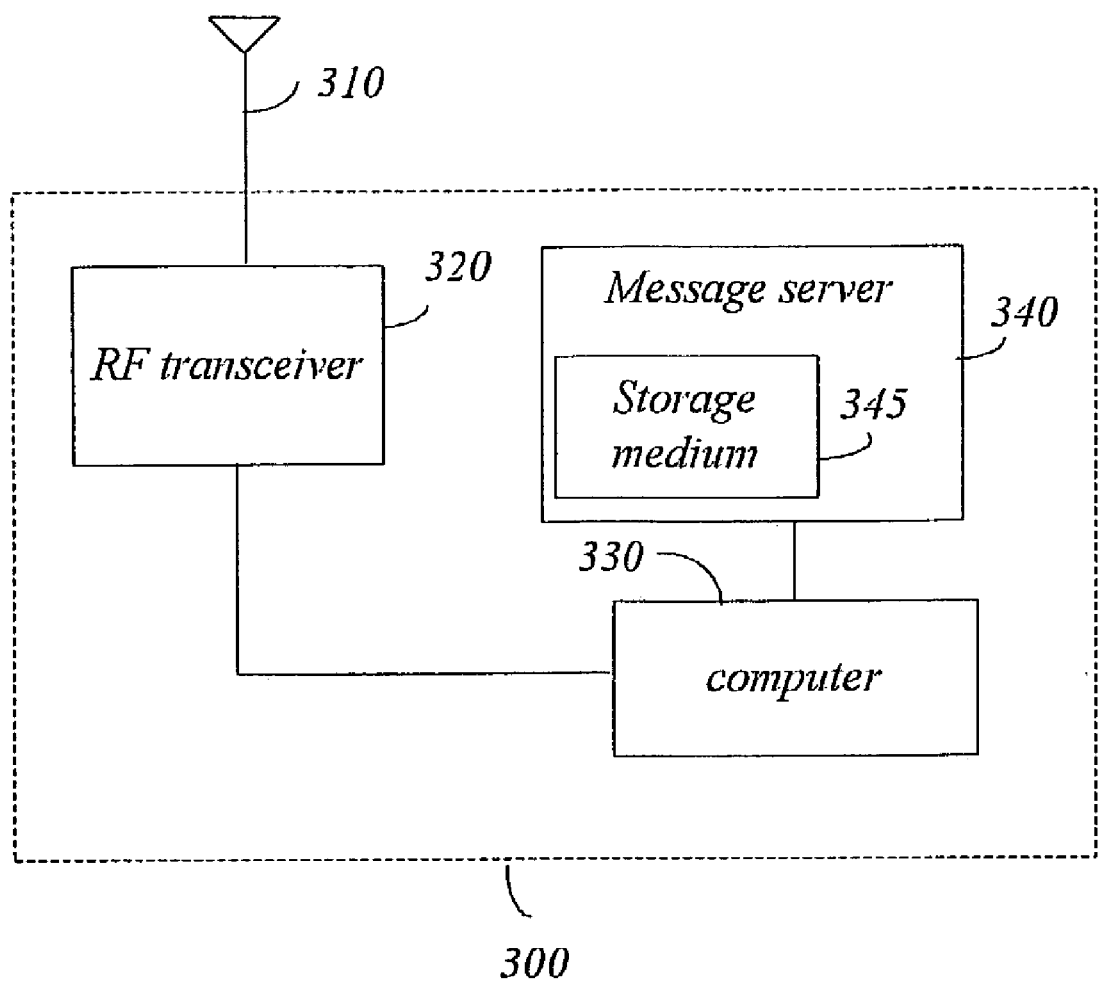
FIG. 3 is a schematic block diagram of a base station according to an exemplary embodiment of the present invention.

Turning to FIG. 3, a schematic block diagram of a base station (BS) 300 according to exemplary embodiments of the present invention is shown. Although the scope of the present invention is not limited in this respect, BS 300 may include an antenna 310, for example, a dipole antenna, a Yagi antenna, a multi-pole antenna, and the like. In addition, BS 300 may include a Radio Frequency (RF) transceiver 320, a computer 330, and a message server 340.

In operation, antenna 310 may be used to receive and transmit modulated RF signals that may carry call information and the call content. RF transceiver 320, for example a cellular transceiver, may be used to modulate and/or demodulate the RF signals that carry the call, if desired. Message server 350 may be operably coupled to computer 330 and may include pre-stored messages of users of cellular communication system 100.

Although the scope of the present invention is not limited in this respect, in certain situations, MS 200 may not be in operation and may not receive calls. In such situations, computer 330 may search message server 340 to locate a pre-stored message that the user of MS 200 may have stored for automatically replying to certain callers. If a reply intended for the identified caller is located, computer 330 may reply to the caller using the intended pre-stored message, if desired.

Although the scope of the present invention is not limited in this respect, message server 340 may include a storage medium 345 to store the predefined messages. In embodiments of the present invention, storage medium 345 may include, for example, a hard drive, recordable digital versatile disk (DVD), recordable compact disk, and the like. Furthermore, the predefined messages may be arranged according to a user list wherein a user name may be an entry and/or an address to the predefined message.

Alternatively or additionally computer 330 may search message server 340 according to a set of rules. The set of rules may be configured by the user, for example the user of MS 200, and the rules may instruct computer 330 how to search message server 340 and what to search in message server 340. For example, the user of MS 200 may configure computer 330 to search for call property such as, for example, data, the preference for replying data call according to the type of data call e.g. SMS, email message, image or the like.

Figure 4:
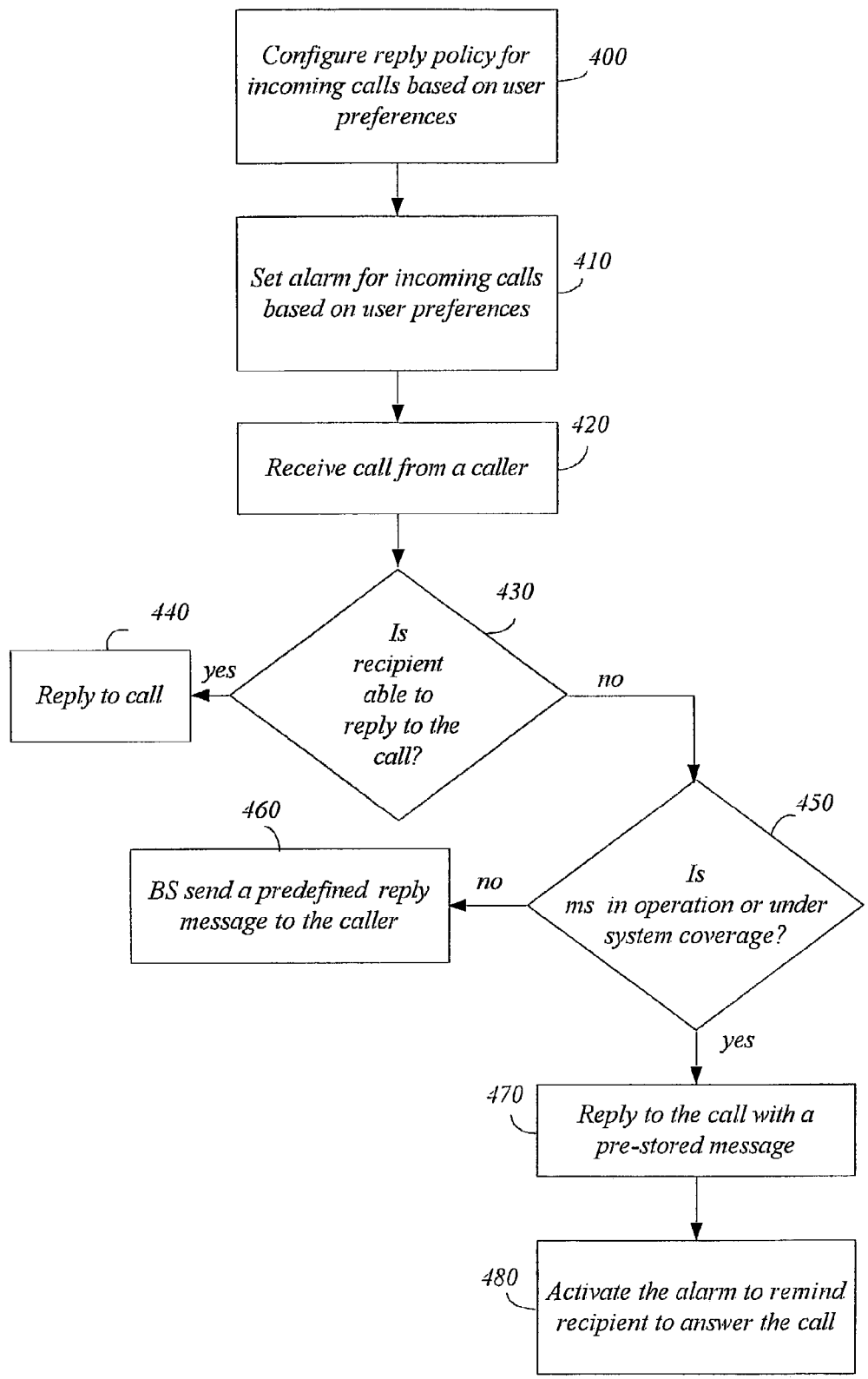
FIG. 4 is a schematic flowchart of a method of automatically replying to incoming calls according to exemplary embodiments of the present invention.

Turning to FIG. 4, a schematic flowchart of a method to automatically reply to calls, according to exemplary embodiments of the present invention, is shown. Although the scope of the present invention is not limited in this respect, the method may begin with configuring a reply policy for incoming calls based on the MS 200 user-selected preferences (block 400). Although the scope of the present invention is not limited in this respect, the user of MS 200 may be referred to herein as the call recipient. For example, the user of MS 200 may attend a meeting or may participate in a social event where operating MS 200 and/or receiving calls and/or responding to calls using MS 200 may be restricted.

Although the scope of the present invention is not limited in this respect, message server 340 of BS 300 may reply to the incoming call with a predefined message, based on user-defined criteria, e.g., the call urgency which criteria may be configured into MS 200 by the user. Furthermore, the user may configure and/or instruct MS 200 to generate different messages to different callers and/or to generate different messages to different types of calls. For example, the call urgency may be determined based on the identity of the caller. The recipient may designate the importance of callers in address list 267. For example, the user may instruct or configure MS 200 to reply to calls received from a "high importance" caller before less important callers, even if the less important calls are received earlier.

Although the scope of the present invention is not limited in this respect, the user may configure user interface 270 to provide predefined alarm patterns based on the user-selected preferences. User interface 270 may set a predefined alarm pattern to notify the user of incoming calls based on the user preferences (block 410). For example, user interface 270 may set light source 280 to blink at different rates for different callers and/or different types of callers. Additionally or alternatively, the user may set vibrator 290 to vibrate at different frequencies for different callers and/or types of callers. Additionally or alternatively, the user may set the audio unit 285 to play different tunes and/or different rings and/or a different tone for different callers and/or types of callers. Furthermore, the audio alarm may be configured to operate after the end of an event, e.g., after a meeting, and/or upon departure from a restricted zone, if desired.

Although the scope of the present invention is not limited in this respect, a call may be received from a certain caller (block 420). If, for example, the recipient/user of MS 200 is able to receive the call (diamond 430), then the user may reply to the call (block 440). However if, for example, the recipient of MS 200 may not be able to reply to the call (diamond 430) and MS 200 may be in operation and under the coverage of cellular communication system 100 (diamond 450), then MS 200 may reply to the call with a pre-stored message based on the configuration configured by the recipient (block 470). In addition, the alarm may be activated to remind the recipient to reply to the call when available (block 480).

Additionally or alternatively, if MS 200 is not in operation or not under the coverage of cellular communication system 100 (diamond 450) then BS 300 may reply to the call by sending a predefined message to the caller, if desired (block 460).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
   storing at a base station a predefined, user-configurable message received from a mobile station;
   replying by the base station to an incoming call addressed to the mobile station with the predefined, user-configurable message in response to a property of the incoming call;
   activating a user-configurable alarm to notify a user of the mobile station of the incoming call; and
   setting the alarm to remind the user of the mobile station to reply to the call according to an availability of the mobile station to reply to the call.

2. The method of claim 1, wherein replying to the incoming call by the base station comprises replying to the incoming call when the mobile station is not in operation.

3. The method of claim 1 wherein replying to the incoming call by the base station comprises:
   replying to the incoming call when the mobile station is out of the wireless communication system coverage range.

4. The method of claim 1 further comprising repeatedly notifying the mobile station for the incoming call based on said property of the incoming call and wherein said property comprises call urgency.

5. A mobile station comprising:
   a configuration module to configure a user-configurable preferences list based on an address of a caller received with an incoming call; and
   a message generator to generate a predefined, user-configurable message based on the user-configurable preferences list, wherein the predefined, user-configurable message is adapted to be used by a base station to reply the incoming call;
   a memory to store said user-configurable preferences list and said address of a caller in an address list; and
   a computer to search said address list and the user-configurable preferences list based on the address of the caller, and to provide a rule for replying to the incoming call based on the caller address.

6. The mobile station of claim 5, further comprising:
   a user interface to set an alarm to notify a user of said incoming call based on a call property.

7. The mobile station of claim 5, wherein the computer is operably coupled to the configuration module and is able to control the message generator to reply to the incoming call with said reply message.

8. The mobile station of claim 5, wherein the predefined, user-configurable message is based on the urgency of the incoming call.

9. A mobile station comprising:
   a dipole antenna to receive an incoming call;
   a configuration module to configure a user-configurable preferences list based on an address of a caller received with the incoming call; and
   a message generator to generate a predefined, user-configurable message based on the user-configurable preferences list, wherein the predefined, user-configurable message is adapted to be used by a base station to reply the incoming call;
   a memory to store said user-configurable preferences list and said address of a caller in an address list; and
   a computer to search said address list and the user-configurable preferences list based on the address of the caller, and to provide a rule for replying to the incoming call based on the caller address.

10. The mobile station of claim 9, comprising:
    a user interface to set an alarm to notify a user of said incoming call based on the call property.

11. The mobile station of claim 9, wherein the computer is operably coupled to the configuration module and is able to control the message generator to reply to the incoming call with said reply message.

12. The mobile station of claim 9, wherein the predefined, user-configurable message is based on the urgency of the incoming call.

13. An article comprising a storage medium having stored thereon instructions that when executed result in:
    storing at a base station a predefined, user-configurable message received from a mobile station; and
    replying by the base station to an incoming call addressed to the mobile station with the predefined, user-configurable message in response to a property of the incoming call;
    activating a user-configurable alarm to notify a user of the mobile station of the incoming call; and setting the alarm to remind the user of the mobile station to reply to the call according to an availability of the mobile station to reply to the call.

14. The article of claim 13, wherein the instruction of replying when executed further results in:

replying to the incoming call when the mobile station is not in operation.

15. The article of claim 13, wherein the instructions when executed result in:

repeatedly notifying the mobile station for the incoming call having said call property comprises call urgency.

16. A cellular communication system comprising:

a mobile station to configure a user-configurable preferences list based on an address of a caller received with an incoming call, and to generate a predefined, user-configurable message based on the user-configurable preferences list wherein said mobile station includes:

a memory to store said user-configurable preferences list and said address of a caller in an address list;

a computer to search said address list and the user-configurable preferences list based on the address of the caller, and to provide a rule for replying to the incoming call based on the caller address; and a base station to reply to the incoming call with the predefined, user-configurable message.

17. The cellular communication system of claim 16, wherein the mobile station comprises:

a configuration module to configure the user-configurable preferences list based on said address of a caller;

a message generator to generate the predefined, user-configurable message; and a transmitter to transmit to the base station the predefined, user-configurable message.

18. The cellular communication system of claim 16, wherein the base station comprises:

a message server to reply to the incoming call with the predefined, user-configurable message generated at the mobile station based on the urgency of the call.

19. The cellular communication system of claim 18, wherein the message server is configured to reply to the call with the predefined, user-configurable message when the mobile station is not in operation.

* * * * *